(12) United States Patent
Sakuyama

(10) Patent No.: US 8,381,892 B2
(45) Date of Patent: Feb. 26, 2013

(54) MOTORCYCLE

(75) Inventor: Hisashi Sakuyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 550 days.

(21) Appl. No.: 12/400,434

(22) Filed: Mar. 9, 2009

(65) Prior Publication Data

US 2009/0229944 A1 Sep. 17, 2009

(30) Foreign Application Priority Data

Mar. 12, 2008 (JP) ................ 2008-062726

(51) Int. Cl.
*F16D 23/12* (2006.01)
*B62D 61/02* (2006.01)

(52) U.S. Cl. ............ 192/96; 192/99 S; 192/112

(58) Field of Classification Search .......... 192/96, 192/99 S, 112
See application file for complete search history.

(56) References Cited

U.S. PATENT DOCUMENTS

| | | | |
|---|---|---|---|
| 3,438,277 A * | 4/1969 | Okamoto ................ 74/371 |
| 6,705,446 B2 * | 3/2004 | Drussel et al. ............ 192/83 |
| 7,325,531 B2 * | 2/2008 | Suzuki ................ 123/336 |
| 7,395,912 B2 * | 7/2008 | Ooishi et al. ............ 192/99 S |
| 7,770,481 B2 * | 8/2010 | Takemoto et al. ........ 74/337.5 |
| 7,819,232 B2 * | 10/2010 | Ishida et al. ............ 192/96 |
| 7,828,131 B2 * | 11/2010 | Iwashita et al. ........... 192/83 |
| 2006/0264284 A1 * | 11/2006 | Iwaki .................... 474/140 |
| 2008/0149409 A1 * | 6/2008 | Watanabe et al. ........ 180/219 |
| 2009/0249914 A1 * | 10/2009 | Kashiwai et al. ........ 74/473.21 |

FOREIGN PATENT DOCUMENTS

| | | |
|---|---|---|
| JP | 8-177876 A | 7/1996 |
| JP | 2007-290640 A | 11/2007 |

* cited by examiner

*Primary Examiner* — David D Le
*Assistant Examiner* — Jacob S Scott
(74) *Attorney, Agent, or Firm* — Birch, Stewart, Kolasch & Birch, LLP

(57) ABSTRACT

In a motorcycle, a cable linked with a clutch release lever is reduced in length and arranged without being bent so much. A release mechanism for a friction type clutch device is provided with a clutch release lever on a lateral surface of a crankcase that is linked with a cable connected to a clutch operational lever disposed on the left side of a steering handlebar that is turned to perform a clutch release operation. The clutch release lever includes an arm portion linked with the cable and a release rod turned together with the arm portion to press the push rod. The release rod is disposed on a left side portion of the crankcase and the arm portion is attached to project outwardly of the crankcase. The clutch release lever is turned clockwise as viewed from above a vehicle body to perform clutch release operation.

16 Claims, 9 Drawing Sheets

MOTORCYCLE

CROSS-REFERENCE TO RELATED APPLICATIONS

The present application claims priority under 35 USC 119 to Japanese Patent Application No. 2008-062726 filed on Mar. 12, 2008 the entire contents of which are hereby incorporated by reference.

BACKGROUND OF THE INVENTION

1. Field of the Invention

The present invention relates to a motorcycle provided with a clutch release lever.

2. Description of Background Art

A clutch release mechanism of a motorcycle is known wherein a clutch release lever attached to a crankcase is turned via a cable linked with a clutch operational lever to release a clutch. See, for example, Japanese Patent Laid-Open No. Hei 8-177876 and Japanese Patent Laid-Open No. 2007-290640.

It is desired to arrange a cable extending from a clutch operational lever to a clutch release lever to be as short as possible and not to be bent as much as possible in order to keep a satisfactory operational feeling of the clutch operation lever.

SUMMARY AND OBJECTS OF TILE INVENTION

Accordingly, it is an object of an embodiment of the present invention to make it possible, in a motorcycle provided with a cable linked to a clutch operational lever and with a clutch release lever, to arrange the cable as short as possible without being bent so much.

To solve the above problem, according to an embodiment of the present invention a motorcycle is provided with a release mechanism for a friction type clutch device, in which a clutch release lever is provided on a lateral surface of a crankcase and is linked with a cable connected to a clutch operational lever disposed on the left side of a steering handlebar that is turned to press a push rod connected to the clutch device for performing a clutch release operation. The clutch release lever includes an arm portion linked with the cable and a release rod turned together with the arm portion to press the push rod, the release rod is disposed on a left side portion of the crankcase and the arm portion is attached to project outwardly of the crankcase. The clutch release lever is turned clockwise as viewed from above a vehicle body to perform a clutch release operation.

With this configuration, similarly to the clutch operation lever, the clutch release lever is disposed on the left side portion of the crankcase, which is the left side of the vehicle body. Therefore, the distance between the clutch operational lever and the clutch release lever can be reduced. Further, since the arm portion of the clutch release lever projects outwardly of the crankcase, the cable can be arranged generally linearly from the clutch operational lever to the arm portion of the clutch release lever. Thus, the cable connecting the clutch operational lever with the clutch release lever can be reduced in length and arranged without being bent so much.

In addition, according to an embodiment of the present invention a motorcycle includes a sprocket cover for covering a lateral side of a drive sprocket for driving a chain adapted to transmit power to a rear wheel. A clutch release cover is provided for covering a lateral side of a clutch release lever linked with a cable connected to a clutch operation lever. The sprocket cover and the clutch release cover are formed integrally with each other.

With this configuration, since the lateral side of the clutch release lever can be covered by the clutch release cover, the clutch release lever can be protected from dirt and from foreign matter.

More specifically, most of the conventional motorcycles are not provided with a cover-like component adapted to cover the clutch release cover. However, if the clutch release lever projects laterally of the crankcase, it is sometimes preferable to take measures to avoid adhesion of dirt or the like, depending on the position of the clutch release lever.

In view of this point, according to the configuration of the present invention, the clutch release lever is laterally covered by the clutch release cover. Therefore, the clutch release lever is prevented from being influenced by dirt regardless of the location thereof to eliminate the maintenance such as cleaning of the clutch release lever. In addition, the clutch release lever is shielded to provide an aesthetic effect to make a neat external appearance of the periphery of the crankcase.

Further, since the sprocket cover and the clutch release cover are formed integrally with each other, the clutch release lever can be protected with a simple structure. This can easily be achieved at low costs by the small number of component parts and less assembly man-hours.

Furthermore, if the present invention is applied to, e.g., a configuration in which the clutch release lever projects outwardly of the crankcase, the external appearance can be made simple by integrally forming the sprocket cover and the clutch release cover and the clutch release lever can be protected with a simple structure. This can easily be achieved at low costs by the small number of component parts and less assembly man-hours.

Additionally, in the configuration described above, the crankcase may be formed with a protruding portion formed by outwardly protruding a clutch release lever installing portion installed with the clutch release lever, and the clutch release cover formed integrally with the sprocket cover may be attached to and abutted against the protruding portion.

According to this configuration, since the clutch release cover is attached to and abutted against the protruding portion of the crankcase, it can properly be positioned. If force is applied to the clutch release cover, the protruding portion serves as a receiver to prevent the deformation of the clutch release cover, which provides an effect of increasing the strength of the clutch release cover.

Further, the clutch release cover may be provided with a raised projection having a concave portion in contact with the protruding portion and the projection is formed to contact a lateral surface of the protruding portion.

According to this configuration, since the projection, with the concave portion, of the clutch release cover is engaged with the protruding portion, the clutch release cover can easily be positioned. In addition, since the projection and the protruding portion are engaged with each other, misalignment can be prevented to ensure fixation.

In the motorcycle of an embodiment of the present invention, the distance between the clutch operational lever and the arm portion can be reduced and the cable can be arranged generally linearly. Therefore, the cable connecting the clutch operational lever with the clutch release lever can be reduced in length and arranged without being bent so much.

In addition, the clutch release lever can be prevented by the clutch release cover from dirt and from foreign matter. Since the sprocket cover and the clutch release cover are formed integrally with each other, the clutch release lever can be protected with a simple structure. This can easily be achieved at low costs by the small number of component parts and less assembly man-hours.

If the clutch release cover projects outwardly of the crankcase, the sprocket cover and the clutch release cover are formed integrally with each other to simplify the external appearance. In addition, the clutch release lever can be protected with a simple structure. This can easily be achieved at low costs by the small number of component parts and less assembly man-hours.

The clutch release cover is abutted against the protruding portion of the crankcase to thereby be properly positioned. In addition, since the protruding portion receives the force applied to the clutch release cover, an effect of increasing the strength of the clutch release cover is provided.

Further, since the projection, with the concave portion, of the clutch release cover is engaged with the protruding portion, the clutch release cover can be positioned with ease. In addition, since the projection and the protruding portion are engaged with each other, misalignment can be prevented to ensure fixation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

A preferred embodiment of the present invention will hereinafter be described with reference to the accompanying drawings. Upside and downside, front and back or rear, and left and right are based on the upside and downside, front and back or rear, and left and right of a vehicle in this specification.

Figure 1:
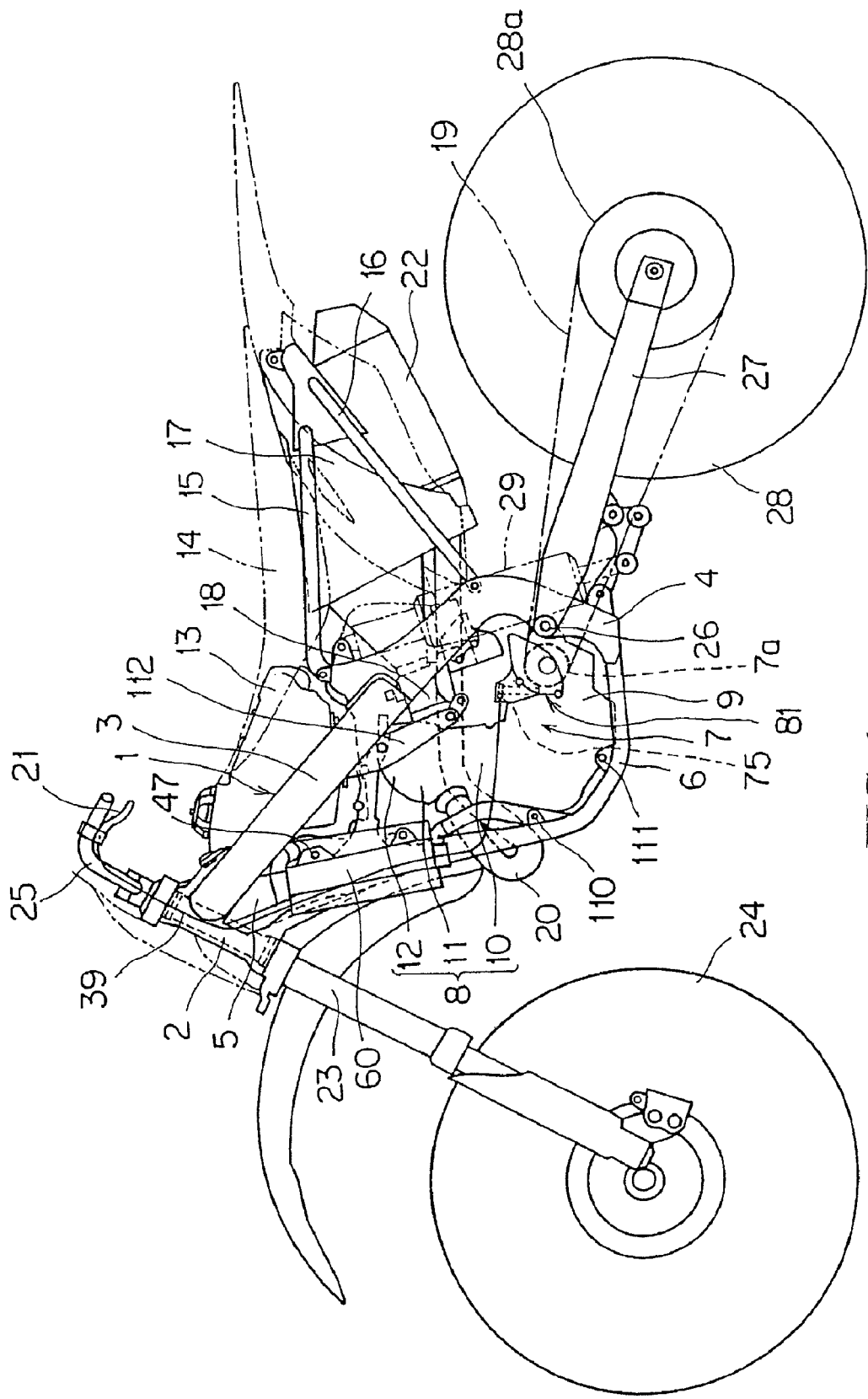
FIG. 1 is a lateral view of a motorcycle according to an embodiment of the present invention.

FIG. 1 is a lateral view of an off-road motorcycle according to an embodiment of the present invention.

A body frame 1 of the motorcycle includes a head pipe 2, a pair of left and right main frames 3, a pair of left right center frame 4, a down frame 5 and a pair of left and right lower frames 6. These components are connected with one another in a loop manner and support an engine 7 inside thereof. The engine 7 includes a cylinder 8 and a crankcase 9. Each of the head pipe 2 and the down frame 5 is a single one and is provided to extend along a body center.

The main frame 3 extends linearly obliquely downwardly above the engine 7 from the head pipe 2 toward the rearward and connects with an upper end of the center frame 4 vertically extending rearward of the engine 7. The down frame 5 extends obliquely downwardly forward of the engine 7 from the head pipe 2 and connects at a lower end with a front end of the lower frame 6. The lower frame 6 bends from forward of and below the engine 7 toward below the engine 7, generally linearly extending toward the rearward, and connects at a rear end with a lower end of the center frame 4.

The engine 7 is of a water-cooled 4-cycle type. The cylinder 8 is located forward of the crankcase 9 in an upright state where its cylinder axis extends generally vertically. In addition, the cylinder 8 includes a cylinder block 10, a cylinder head 11 and a head cover 12 provided in this order from down to up. The cylinder 8 is made upright to reduce the back-and-forth directional length of the engine 7. Thus, the engine 7 is configured to be suitable for an off-roader.

Above the engine 7, a fuel tank 13 is supported on the main frames 3. A built-in fuel pump (not shown) is housed inside the fuel tank 13. High-pressure fuel is supplied from the fuel pump to a throttle body 18 via a fuel supply pipe.

A seat 14 is disposed rearward of the fuel tank 13 and is supported on seat rails 15 extending rearward from the upper ends of the center frames 4. Rear frames 16 are disposed below the seat rails 15. An air cleaner box 17 is supported by the seat rails 15 and the rear frames 16. Air flowing into and purified in the air cleaner box 17 passes through a throttle body 18 to be formed into a mixture. This mixture is supplied to the cylinder head 11 from the rear side of a vehicle body.

An exhaust pipe 20 is joined to the front of the cylinder 8. The exhaust pipe 20 extends from the front of the cylinder 8 to the front of the crankcase 9, bending to the right, and then extends toward the rear on the right side of the vehicle body. A muffler 22 extends from the exhaust pipe 22 toward the rear. A rear end of the muffler 22 is supported by the rear frames 16.

A front fork 23 is supported by the head pipe 2. A front wheel 24, supported by the lower end of the front fork 23, is steered by a steering handlebar 25 attached to the upper end of the front fork 23.

A clutch operational lever 21 used for clutch operation is attached to the steering handlebar 25 on the vehicle body left side. A cable 39 used to transmit clutch operation is connected at one end to the clutch operational lever 21. The cable 39 extends downwardly of the vehicle body along the down frame 5 on the vehicle body left side, passing on the vehicle body left side of the cylinder block 10, and connects with a wire attachment portion 75 in the vicinity of the crankcase 9. For details, the cable 39 is configured to include a wire (not shown) and an outer cable (not shown) covering the wire and clutch operation moves the wire inside the outer cable to transmit operation. Thus, if the cable 39 has a large length and/or bend, friction between the wire and the outer cable increases to affect a clutch-operational feeling. The cable 39 is supported by a stay (not shown) attached to a left portion of the crankcase 9.

A rear arm 27 is connected at a front end to the center frame 4 via a pivot shaft 26 so as to be swingably supported thereby. A rear wheel 28 is supported by a rear end of the rear arm 27 and is driven by a drive chain 19 wound around a drive sprocket 7a of the engine 7 and around a driven sprocket 28a of the rear wheel 28. A shock absorber unit 29 of a rear suspension is provided between the rear arm 27 and the rear end of the center frame 4.

In FIG. 1, a radiator 60 is illustrated together with a rubber mount portion 47 of the radiator, engine mount portions 110, 110, and an engine hanger 112. Further, the engine 7 is supported by the center frames 4 also via the pivot shaft 26.

Figure 2:
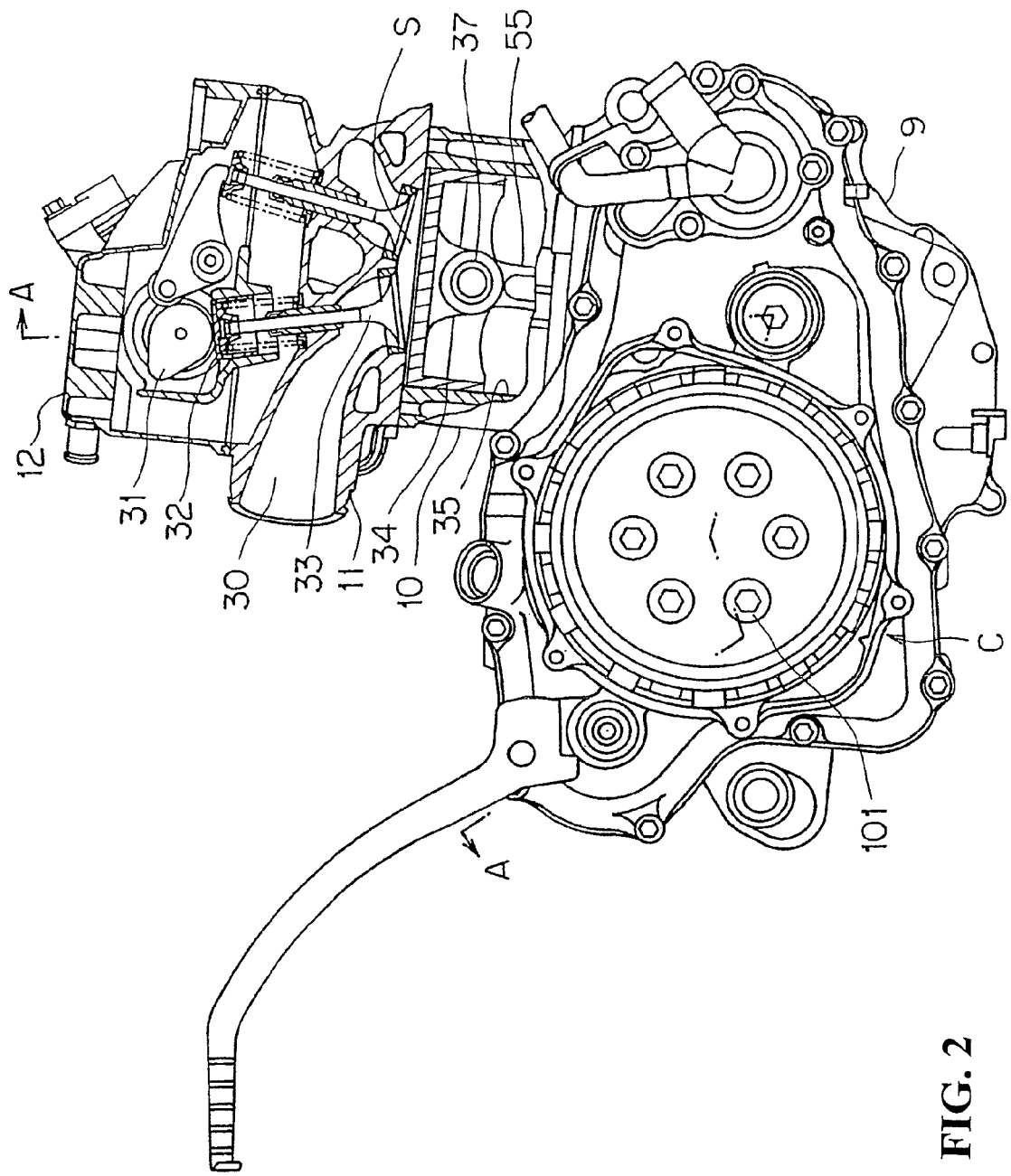
FIG. 2 is a partial broken-out right lateral view of the engine.
Figure 3:
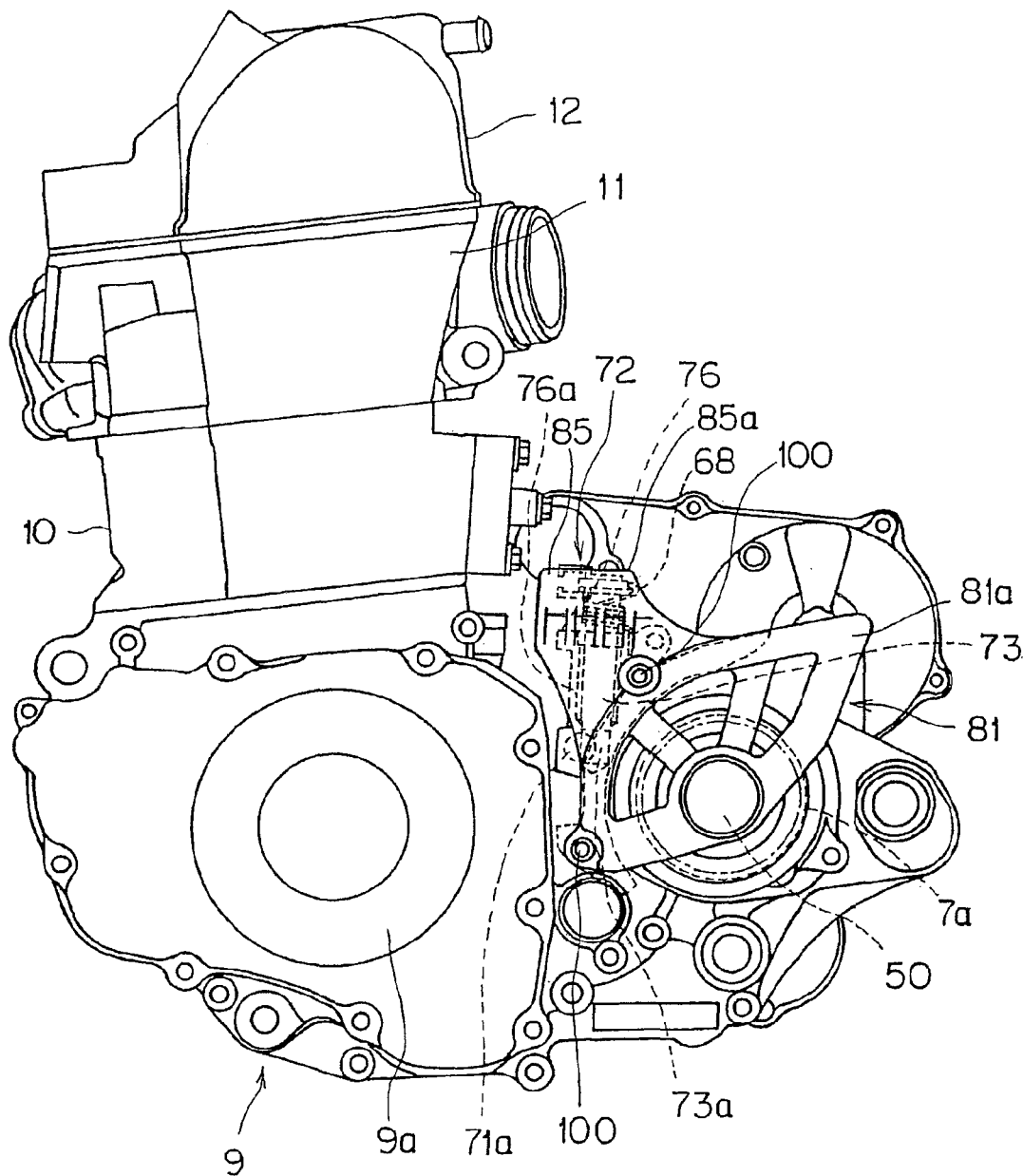
FIG. 3 is a left lateral view of the engine.
Figure 4:
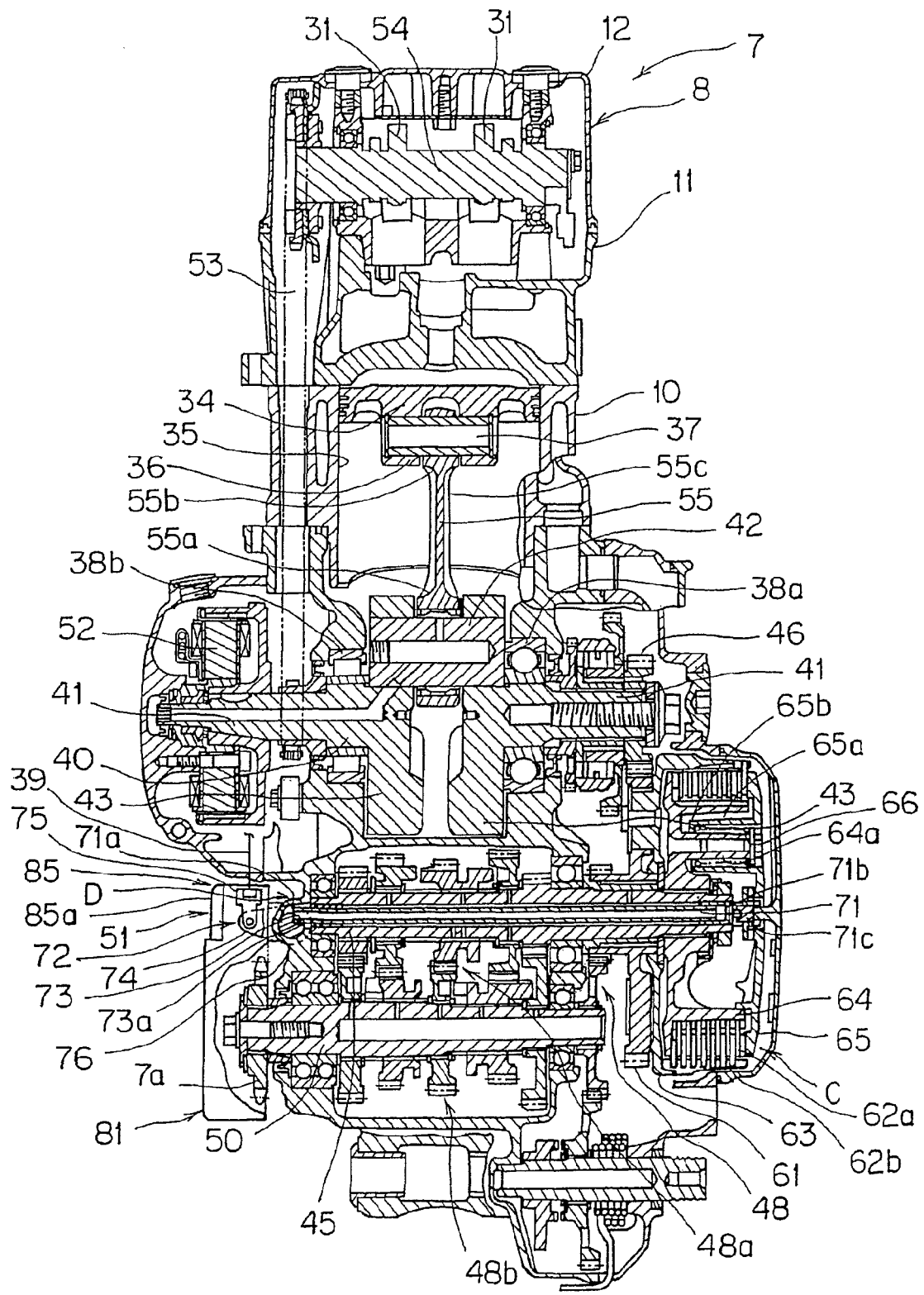
FIG. 4 is a cross-sectional view of the engine taking along line A-A in FIG. 2.

FIG. 2 is a partial broken-out right lateral view of the engine 7. FIG. 3 is a left lateral view of the engine 7. FIG. 4 is a cross-sectional view of the engine 7 taking along line A-A in FIG. 2.

As described above, the engine 7 includes the cylinder 8 composed of the cylinder block 10, cylinder head 11 and head cover 12, and the crankcase 9.

An intake port 30, adapted to supply the mixture from a throttle body 18 (see FIG. 1) into the engine 7, is provided on the vehicle body rear side of the cylinder head 11. The intake port 30 is opened and closed by an intake valve 33 moved upwardly and downwardly by a cam 31 and a valve lifer 32 attached to the head cover 12, and is thus adapted to supply a mixture into a combustion chamber S (see FIG. 2). Similarly, an exhaust port (not shown) is provided on the vehicle body front side of the cylinder head 11 and is adapted to discharge the mixture burned in the combustion chamber S.

The cylinder block 10 is formed with a cylinder portion 35 in which a piston 34 can be reciprocated vertically (more properly, in a forwardly obliquely upwardly, slightly inclined direction).

On the other hand, a crankshaft 40 located below the piston 34, a main shaft 45 located on the vehicle body rear side of the crankshaft 40, a drive shaft 50 located further on the vehicle body rear side of the main shaft 45 are provided in the crankcase 9 as shown in FIG. 4. The crankshaft 40, the main shaft 45 and the drive shaft 50 have respective rotational axes disposed parallel to each other and receive power transmitted thereto via gears described later.

As shown in FIG. 4, the crankshaft 40 includes crank journals 41 located at both ends thereof so as to be rotatably journaled by a crankcase main body; a crank pin 42 located eccentrically from the crank journals 41; and a pair of left and right crank arms 43 connecting the corresponding crank journals 41 with the crank pin 42. The crank journal 41 and the crank arm 43 are formed integrally with each other.

The crank journals 41 located at both the ends of the crankshaft 40 are rotatably journaled by corresponding bearings 38a, 38b.

One end 55a of a connecting rod 55 is turnably connected to the crankpin 42. On the other hand, the piston 34 is turnably connected to the other end 55b of the connecting rod 55 via the piston pin 37, more specifically, via a boss portion 36 located at the lower end of the piston 34.

In addition, the connecting rod 55 vertically extends to form an arm of a link mechanism. When the piston moves upwardly and downwardly, the crankpin 42 rotates around the rotational axis of the crank journals 41 to apply rotational power to the crankshaft 40.

As shown in FIG. 4, a primary reduction gear 46 rotated together with the crankshaft 40 is provided on the vehicle body right portion of the crankshaft 40. This primary reduction gear 46 is connected to a clutch mechanism C installed on the main shaft 45. With this, the rotational power of the crankshaft 40 is transmitted from the primary reduction gear 46 to the main shaft 45 via the clutch mechanism C.

A speed-change gear group 48 for five speeds is provided on the main shaft 45 and drive shaft 50 to constitute a transmission mechanism 51. For details, a speed-change gear group 48a is provided on the main shaft 45 and a speed-change gear group 48b corresponding to and meshing engagement with the speed-change gear group 48a is provided on the drive shaft 50. Switching the meshing engagement of the speed-change gear group 48 changes the rotating speed of the drive shaft 50 and transmits rotational power from the main shaft 45 to the drive shaft 50.

The drive sprocket 7a is assembled to a vehicle body left end of the drive shaft 50, i.e., to an shaft end of the drive shaft 50 projecting outwardly from the crankcase 9. The drive chain 19 is wound around the drive sprocket 7a as shown in FIG. 1 and drives the rear wheel 28.

As shown in FIG. 4, a generator 52 for power generation is secured to the shaft end of the crankshaft 40 on the side opposite to the primary reduction gear 46. The crankcase 9 is provided with a generator cover portion 9a for housing the generator 52. The power of the crankshaft 40 is transmitted to the cam shaft 54 via the cam chain 53.

The clutch mechanism C is a multiple disc friction clutch capable of connection and disconnection of power transmission between the crankshaft 40 and the main shaft 45. In addition, the clutch mechanism C is housed in a projecting housing portion provided on the vehicle body right lateral surface side of the crankcase 9. The clutch mechanism C includes a housing gear 61 meshed with the primary reduction gear 46; clutch plates 62a and friction plates 62b; a clutch housing 63 housing these components; an inner hub 64 secured to the end of the main shaft 45; a pressure plate 65 movable in the axial direction of the main shaft 45; and a clutch spring for biasing the pressure plate 65.

The housing gear 61 is joined to the clutch housing 63 for integral rotation. The housing gear 61 and the clutch housing 63 are mounted to the main shaft 45 for rotation relative thereto. An annular friction plate 62b is spline-fitted to the cylindrical inner circumferential portion of the clutch housing 63. The inner hub 64 is secured to the inside of the clutch housing 63 so as to rotate integrally with the main shaft 45. The annular clutch plates 62a are spline-fitted to the outer circumferential portion of the inner hub 64. A plurality of the clutch plates 62a and of the friction plates 62b are provided to alternately overlap with each other and are movable in the axial direction of the main shaft 45 inside the clutch housing 63.

The inner hub 64 is provided with cylindrical projecting portions 64a at the six positions so as to equally divide into six segments in a circle concentric with the main shaft 45, the projecting portions projecting externally of the crankcase 9. On the other hand, the pressure plate 65 is provided with a plurality of cylindrical depressed portions 65a at positions corresponding to the projecting portions 64a, the depressed portions 65a being recessed inward of the crankcase 9. In addition, each depressed portion 65a is formed at an end with a seat surface 65b adapted to receive the clutch spring 66. The pressure plate 65 is mounted to the inner hub 64 parallel to the clutch plates 62a in such a manner that each of the projecting portions 64a pass through a corresponding one of the depressed portions 65a. The clutch springs 66 are fitted and secured to the respective projecting portions 64a while being compressed by the seat surfaces 65b of the pressure plate 65 and by bolts 101 (see FIG. 2) attached to the ends of the projecting portions 64a. In this way, the pressure plate 65 brings the clutch mechanism C into an engagement state by pressing the clutch plates 62a and the friction plates 62b against each other by the elastic force of the clutch springs 66. This can transmit power to the inner hub 64.

Figure 5:
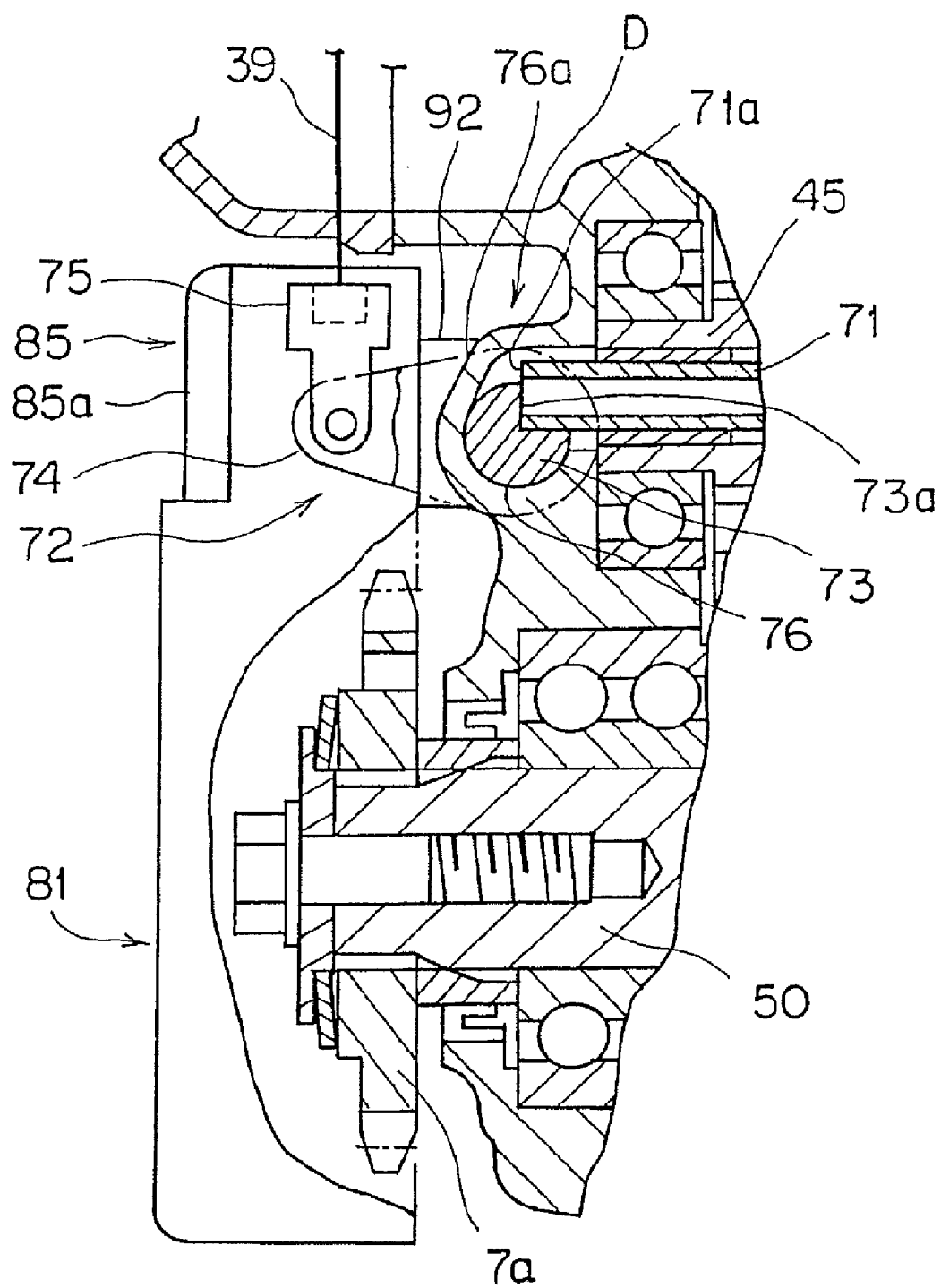
FIG. 5 is an enlarged view illustrating the vicinity of a sprocket cover.

FIG. 5 is an enlarged view illustrating the drive sprocket 7a and the vicinity thereof in FIG. 4.

A clutch release mechanism D for engaging and disengaging the clutch includes a push rod 71 provided inside the hollow main shaft 45 concentrically with the main shaft 45, and a clutch release lever 72 for operating the push rod 71. The push rod 71 is a shaft axially movable inside the main shaft 45. As shown in FIGS. 3 to 5, the clutch release lever 72 is provided with a horizontally extending plate-like arm portion 74 at the upper end of a release rod 73 extending vertically of the vehicle body. The release rod 73 is formed at a lower portion with a cam portion 73a in abutment against a tip face of one end 71a of the push rod 71. The cam portion 73a is formed by cutting away a quarter of a cross-sectional circle, in one longitudinal segment, of the release rod 73. Further, the wire attachment portion 75 is provided at the end of the arm portion 74 via a pin so as to be turnable in a plane of the arm portion 74.

The other end 71b of the push rod 71 is connected to the central portion of the pressure plate 65 via a bearing 71c. On the other hand, one end 71a of the push rod 71 terminates at a lateral surface of the crankcase 9 on the opposite side thereof. In the crankcase 9, a clutch release lever installing portion 76 is provided in the vicinity of one end 71a of the push rod 71 so as to be mounted upwardly of the vehicle body and generally vertically to the axial direction of the push rod 71. The clutch release lever installing portion 76 is a portion formed with a hole opened in an upper surface of the crankcase 9 to receive the release rod 73. This hole communicates with a portion through which the push rod 71 passes. A protruding portion 76a resulting from partial external protrusion of the clutch release lever installing portion 76 is formed at a wall portion of the crankcase 9 in the vicinity of the clutch release lever installing portion 76. A lateral surface of the protruding portion 76a is curved. The release rod 73 is fitted to the clutch release lever installing portion 76 and the clutch release lever 72 is turnably attached to the clutch release installing portion 76. The axial center of the release rod 73 is located at a position slightly offset on the vehicle body rear side from the axial center of the push rod 71.

As described above, the clutch release lever 72 is disposed on the left portion of the crankcase 9 and mounted to the clutch release lever installing portion 76 in such a manner that the cam portion 73a of the release rod 73 is abutted against the tip face of one end 71a of the push rod 71. In this state, the arm portion 74 of the clutch release lever 72 faces almost the same direction as the push rod 71. For details, the arm portion 74 and the wire attachment portion 75 generally horizontally projects outwardly from the wall surface, of the crankcase 9 on the left lateral side of the vehicle body, in the vicinity of the clutch release lever installing portion 76.

A return spring 68 is attached to the clutch release lever 72 so as to bias it in a counterclockwise direction as viewed from above the vehicle body.

As shown in FIG. 5, the cable 39 is linked at an end with the wire attachment portion 75 provided to face the front of the vehicle body. The cable 39 extends from the clutch operational lever 21 attached to the left side of the steering handlebar 25 and runs on the left side of the vehicle body. While the clutch is engaged, the end of the arm portion 74 faces almost the same direction as the push rod 71, that is, faces the leftward outside of the vehicle body. If the clutch operational lever 21 is operated, the end of the cable 39 is pulled toward the front of the vehicle body. Along with this, the arm portion 74 of the clutch release lever 72 is turned, together with the release rod 73, clockwise as viewed from above the vehicle body around the release rod 73. The cam portion 73a is clockwise turned together with the release rod 73 so that the vehicle body front end of the cam portion 73a pushes out the push rod 71. This causes the push rod 71 to press the pressure plate 65 disposed on the right side of the crankcase 9, in the right side of the vehicle body to release the pressing force acting between the clutch plates 62a and the friction plates 62b, thereby bringing the clutch into the disengagement state.

As described above, the cable 39 extending from the clutch operational lever 21 attached to the left side of the steering handlebar 25 is linked with the arm portion 74 of the clutch release lever 72 provided similarly on the left side of the vehicle body to protrude from the left outside of the crankcase 9. Since the arm portion 74 protrudes externally of the left portion of the crankcase 9, the cable 39 can be arranged to extend generally linearly from the clutch operational lever 21 to the arm portion 74 of the clutch release lever 72. Thus, the cable 39 connecting the clutch operational lever 21 with the clutch release lever 72 can be reduced in length and arranged without being bent so much.

As shown in FIGS. 3 to 5, a sprocket cover 81 is attached to the vehicle body left lateral surface of the crankcase 9 so as to cover the drive sprocket 7a form the side thereof as well as from the vehicle body front side and upside. The sprocket cover 81 is secured with two bolts 100. An arcuate plate (not shown) is interposed at an attachment portion of the sprocket cover 81 and the crankcase 9.

In FIG. 3 of the lateral view, the sprocket cover 81 laterally covers a large portion of the drive sprocket 7a, while extending from the vicinity of the center of the drive sprocket 7a to the upside thereof. The sprocket cover 81 is integrally composed of a sprocket cover main body portion 81a (a sprocket cover) and a clutch release cover portion 85 (a clutch release cover).

The sprocket cover portion 81a is a cover used to cover the drive sprocket 7a. The clutch release cover portion 85 is a cover used to laterally cover the protruding portion 76a of the clutch release lever installing portion 76 and the clutch release lever 72.

While viewed from above the vehicle body as shown in FIG. 5, a wall portion 85a is provided to extend upwardly at an edge corresponding to the vehicle body outside of the clutch release cover portion 85. As shown in FIG. 3, the arm portion 74 and wire attachment portion 75 of the clutch release lever 72 are laterally covered by the wall portion 85a of the clutch release cover portion 85. Further, the wall portion 85a is formed to have a length, in the vehicle body back-and-forth direction, greater than a range where the arm portion 74 and the wire attachment portion 75 are turned. Because of this, the arm portion 74 and wire attachment portion 75 of the clutch release lever 72 are not exposed to the outside of the vehicle body as viewed from the side. Furthermore, the wall portion 85a is located on the vehicle body outside of a range where the arm portion 74 is turned, thereby ensuring a space where the clutch release lever 72 is turned.

As described above, the vehicle body left surface of the sprocket cover 81 is located at a position on the vehicle body outside of the arm portion 74 of the clutch release lever 72. In addition, the clutch release cover portion 85 laterally covers the arm portion 74 and the wire attachment portion 75. Therefore, the arm portion 74 and the wire attachment portion 75 are prevented by the clutch release cover portion 85 from projecting externally of the vehicle body. This can protect the clutch release lever 72 from e.g. dirt, etc. In this way, the clutch release cover portion 85 formed integrally with the sprocket cover 81 can protect the clutch release lever 72 with a simple structure. This can easily be achieved at low costs by the small number of component parts and less assembly man-hours.

Figure 6:
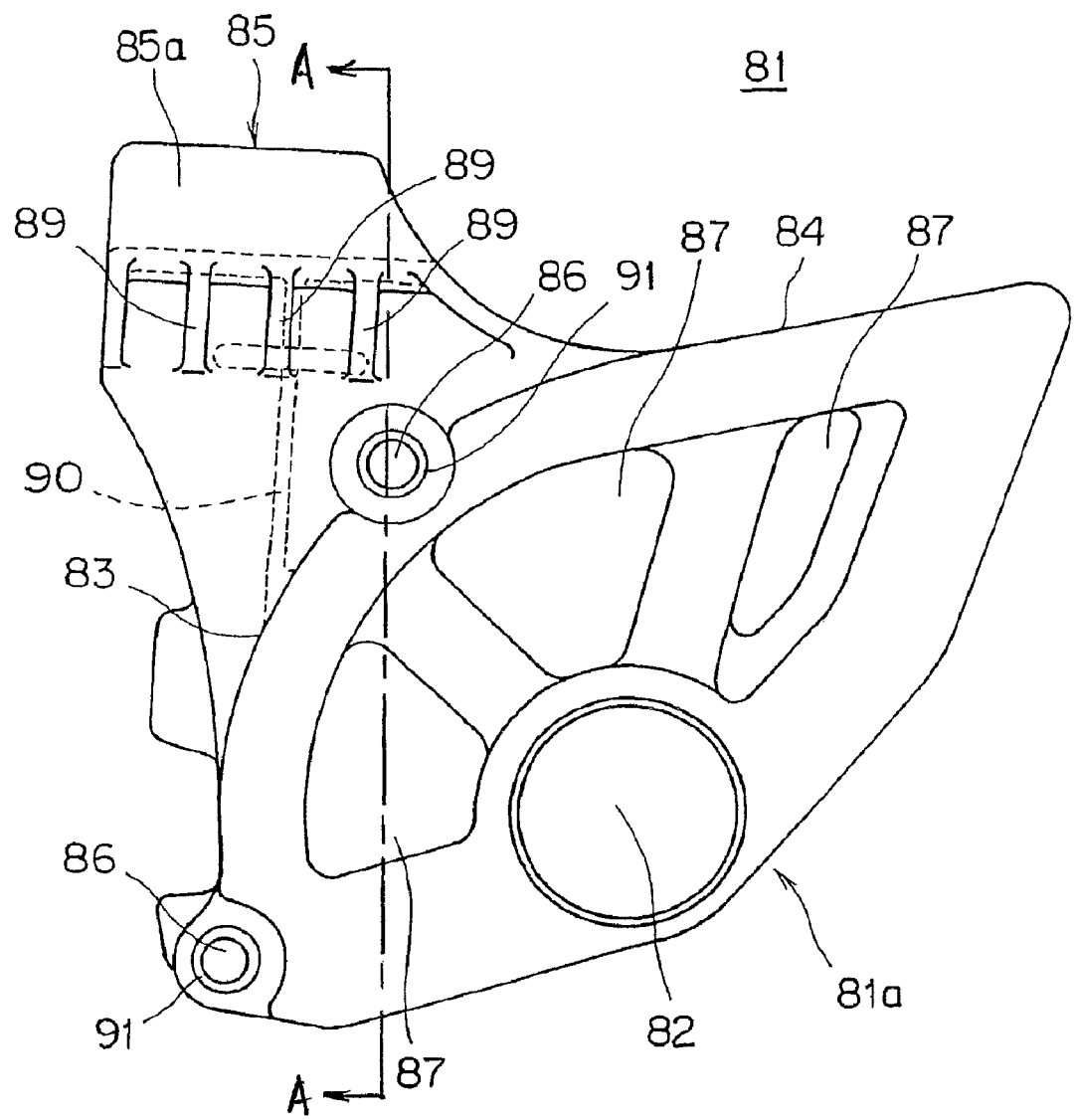
FIG. 6 is an elevation view of the sprocket cover.

FIG. 6 is an elevation view of the sprocket cover 81.

The sprocket cover 81 has a central portion 82 coincident with the axial center of the drive shaft 50 when mounted to the crankcase 9. An arcuate edge portion 83 is formed at a vehicle body front portion of the sprocket cover 81 so as to draw, around the central portion 82, an arc with a diameter greater than that of drive sprocket 7a. In addition, a linear edge portion 84 is formed at a vehicle body rear side of the sprocket cover 81 so as to linearly extend from the arcuate edge portion 83 toward the vehicle body rearward while slanting obliquely upwardly. The sprocket cover 81 is made of resin.

The sprocket cover 81 has a portion, below the arcuate edge portion 83 and the linear edge portion 84, formed as the sprocket cover main body portion 81a covering the drive sprocket 7a. In other words, the sprocket cover 81 is such that the sprocket cover main body portion 81a and the clutch release cover portion 85 are formed integrally with each other with the arcuate edge portion 83 put therebetween.

Further, the sprocket cover 81 is provided at two positions along the arcuate edge portion 83 with holes 86 adapted to receive the bolts 100 passed therethrough. In addition, the sprocket cover 81 is provided with three opening portions 87 between the arcuate edge portion 83 and linear edge portion 84, and the central portion 82.

Figure 7:
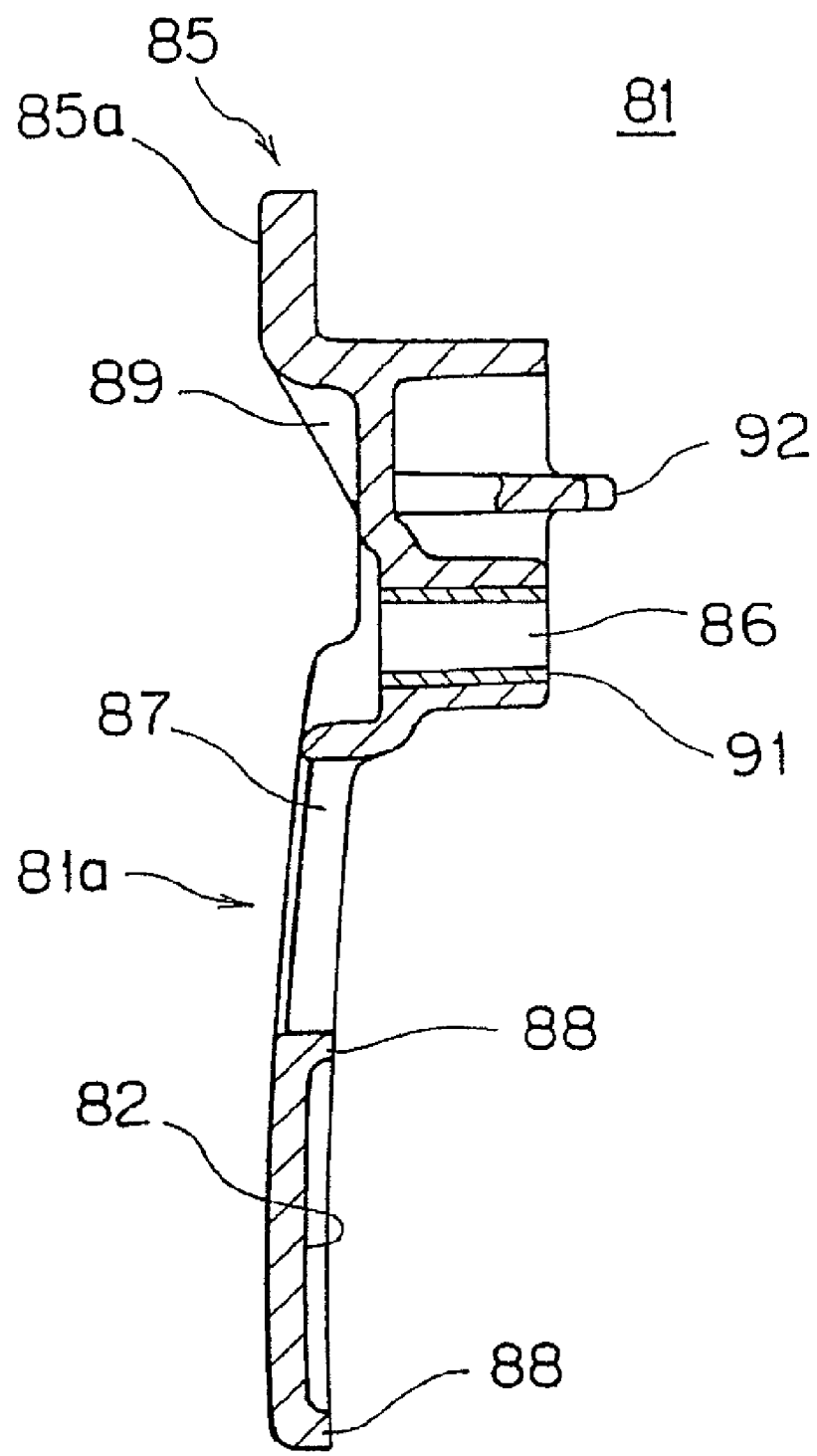
FIG. 7 is a cross-sectional view taken along line A-A of FIG. 6.
Figure 8:
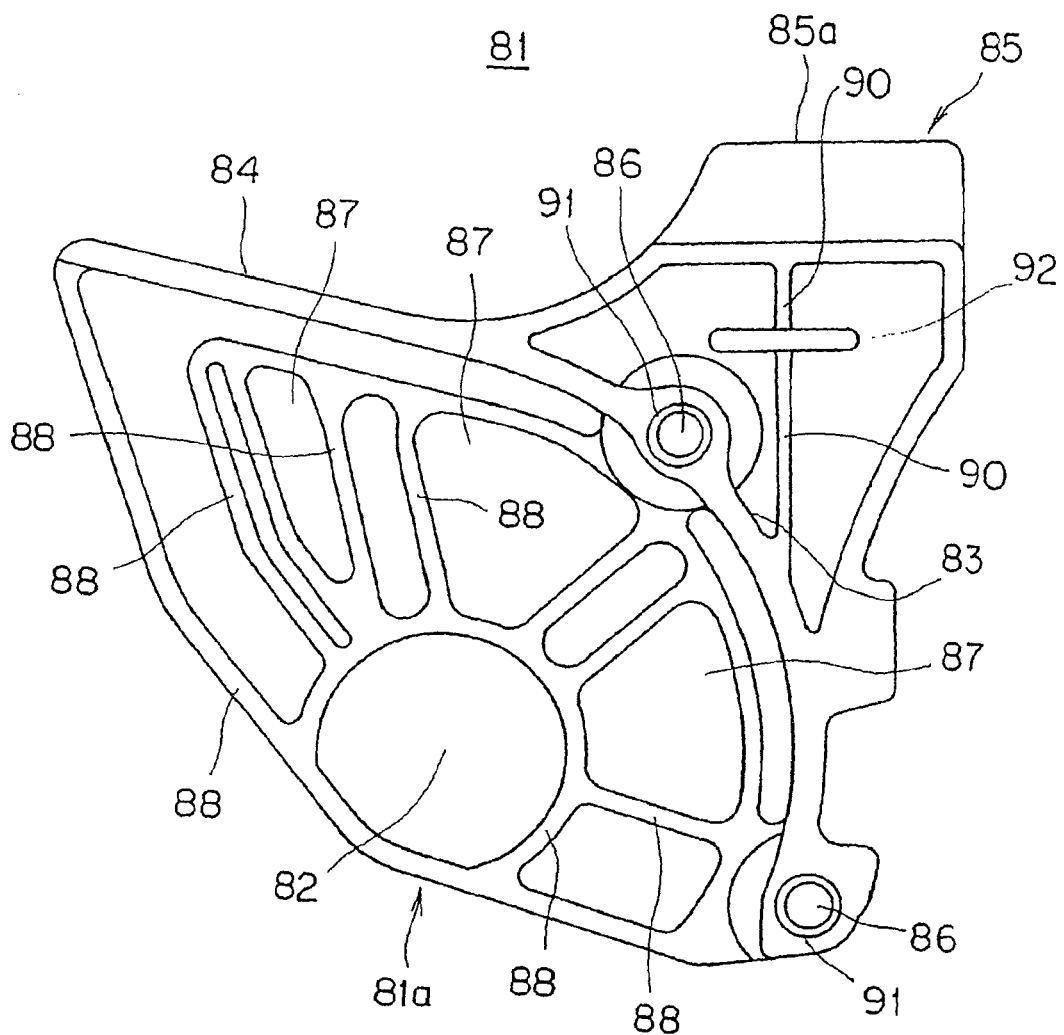
FIG. 8 is an elevation view of the sprocket cover as viewed from the side opposite to that of FIG. 6.

FIG. 7 is a cross-sectional view taken along line A-A of FIG. 6. FIG. 8 is an elevation view of the sprocket cover 81 as viewed from the side opposite to that of FIG. 6.

Referring to FIG. 7, the sprocket cover main body portion 81a is formed like a plate to have a small thickness. On the other hand, a portion, formed with the hole 86, in contact with the plate 79 interposed at the attachment portion with the crankcase 9 is formed to have a large thickness. In addition, also the arcuate edge portion 83, the linear edge portion 84 and the clutch release cover portion 85 are formed to have such a thickness as to be flush with the portion of the hole 86. A metal collar 91 is fitted to each of the holes 86.

An upper portion of the clutch release cover portion 85, including the wall portion 85a is L-shaped in cross-section.

As shown in FIGS. 7 and 8, a surface of the central portion 82 facing the drive sprocket 7a is formed at a lower level and with a rib 88 at an edge thereof. Similarly, ribs 88 are formed at edges of the three opening portions 87 and at an edge of the sprocket cove main body portion 81a. As shown in FIG. 6, also the clutch release cover portion 85 is formed with vertically extending ribs 89 at three positions equally spaced apart from each other. As shown in FIG. 7, the rib 89 is formed like a triangle whose width is narrower in cross-section as it goes downward. A surface of the clutch release cover portion 85 on the side of the crankcase 9 is reduced in thickness and formed with a vertically extending rib 90 at the center thereof. In this way, the sprocket cover 81 is reduced in thickness and formed with the ribs 88, 89, 90 to achieve a balance between weight reduction and increased strength.

Figure 9:
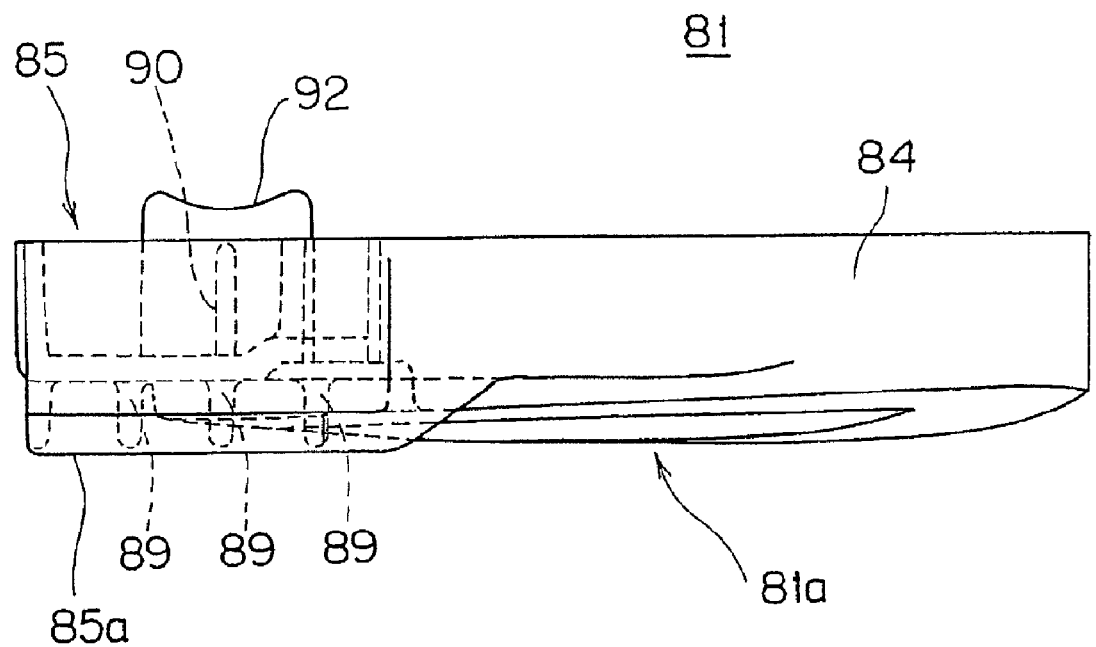
FIG. 9 is a plan view of the sprocket cover as viewed from above a vehicle body.

FIG. 9 is a plan view of the sprocket cover 81 as viewed from above the vehicle body.

The clutch release cover portion 85 is formed on the side of the drive sprocket 7a with a projection 92 projecting toward the vehicle body center from the abutment surface with the plate 79. The projection 92 is formed like a plate as shown in FIG. 7. In addition, the projection 92 is formed at a leading end with a curvedly depressed concave portion, which is engaged with the curvedly protruding portion 76a (see FIG. 5) in the crankcase 9. This can provide an effect that the sprocket cover 81 can easily be attached to the crankcase 9 by bringing the projection 92 and the protruding portion 76a into engagement with each other for positioning, and misalignment of the sprocket cover 81 can be prevented also after the attachment. In addition, if force is laterally applied to the clutch release cover portion 85, since the projection 92 receives the force, deformation of the sprocket cover 81 can be prevented.

As described above, according to the embodiment of the present invention, the clutch release lever 72 is disposed on the same side as the clutch operational lever 21, more specifically, on the left portion of the crankcase 9, which is on the left side of the vehicle body. Therefore, the distance between the clutch operational lever 21 and the clutch release lever 72 is reduced. Further, since the arm portion 74 of the clutch release lever 72 is made to project outwardly of the crankcase 9, the cable 39 can be arranged to extend generally linearly from the clutch operational lever 21 to the clutch release lever 72. Thus, the cable 39 connecting the clutch operational lever 21 with the clutch release lever 72 can be reduced in length and arranged without being bent so much.

Since the clutch release lever 72 is laterally covered by the clutch release cover portion 85, it can be protected from dirt and from foreign matter. Further, the clutch release lever 72 disposed to project outwardly of the crankcase 9 can be protected by the clutch release cover portion 85 formed integrally with the sprocket cover 81. Thus, the external appearance of the motorcycle can be made simple and the clutch release lever 72 can be protected with a simple structure. These can easily be achieved at low costs by the small number of component parts and less assembly man-hours.

Since the clutch release cover portion 85 can be attached to the protruding portion 76a of the crankcase 9 so as to be abutted thereagainst, it can properly be positioned. If force is applied to the clutch release cover portion 85, the protruding portion 76a serves as a receiver to prevent deformation of the clutch release cover portion, which provides an effect of increasing the strength of the clutch release cover portion 85.

Further, the arcuately depressed projection 92 of the clutch release cover portion 85 is engaged with the protruding portion 76a; therefore, the clutch release cover portion 85 can be positioned with ease. In addition, since the projection 92 is fitted to the protruding portion 76a, misalignment therebetween can be prevented to provide reliable fixation.

In addition, the embodiment described above represents one aspect embodying the invention and the invention is not limited to the embodiment described above.

For example, although the embodiment describes the fact that the clutch release lever cover portion 85 laterally covers the clutch release lever 72, the present invention is not limited to this. The clutch release lever 72 may be covered from above and/or from rearward. In addition, although the description is given of the fact that the sprocket cover 81 formed integrally with the clutch release cover portion 85 is formed of resin, it may be formed of metal such an aluminum alloy or the like. Needless to say, the other detailed configurations may arbitrarily be modified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle provided with a release mechanism for a friction type clutch device, in which a clutch release lever provided on a lateral surface of a crankcase and linked with a cable connected to a clutch operational lever disposed on the left side of a steering handlebar is turned to press a push rod connected to the clutch device for performing clutch release operation, comprising:
- an arm portion of the clutch release lever, said arm portion being linked with the cable; and
- a release rod turned together with the arm portion to press the push rod;
- the release rod being disposed on a left side portion of the crankcase and the arm portion being attached to project outwardly of the crankcase,
- the clutch release lever is turned clockwise as viewed from above a vehicle body to perform a clutch release operation,
- a sprocket cover for covering a lateral side of a drive sprocket for driving a chain adapted to transmit power to a rear wheel; and
- a clutch release cover for covering a lateral side of the clutch release lever linked with a cable connected to the clutch operational lever,
- wherein the sprocket cover and the clutch release cover are formed integrally with each other, and wherein the clutch release cover is provided with a raised projection formed at a leading end with a curvedly depressed, concave portion which is engaged with a curvedly protruding portion of the crankcase, and the raised projection is formed to contact a lateral surface of the protruding portion.

2. The motorcycle according to claim 1, wherein the push rod is concentrically disposed within a hollow main shaft and axially movable relative to the hollow main shaft.

3. The motorcycle according to claim 1, wherein the clutch release lever includes a horizontally extending plate arm portion at an upper end of the release rod extending vertically relative to the vehicle body.

4. The motorcycle according to claim 1, wherein the release rod is formed at a lower portion with a cam portion in abutment against a tip face on one end of the push rod.

5. The motorcycle according to claim 4, wherein the cam portion is formed by removing a portion of a cross-section in one longitudinal segment of the release rod.

6. The motorcycle according to claim 1, wherein the cable is secured with a cable attachment portion provided at one end of the arm portion via a pin to be turnable in a plane on the arm portion.

7. The motorcycle according to claim 1, wherein a first end of the push rod is connected to a central portion of a pressure plate via a bearing and a second end of the push rod terminates at a lateral surface of the crankcase on an opposite side thereof.

8. The motorcycle according to claim 1, wherein the curvedly protruding portion of the crankcase is formed by outwardly projecting a clutch release lever installing portion installed with the clutch release lever, and the clutch release cover formed integrally with the sprocket cover is attached to and abutted against the curvedly protruding portion.

9. The motorcycle according to claim 1, wherein the sprocket cover is formed such that a sprocket cover main body portion and the clutch release cover portion are formed integrally with each other with an arcuate edge portion put therebetween.

10. The motorcycle according to claim 1, wherein the sprocket cover is provided at two positions along an arcuate edge portion with holes adapted to receive bolts.

11. The motorcycle according to claim 1, wherein the sprocket cover is provided with multiple opening portions between an arcuate edge portion and a linear edge portion and a central portion thereof.

12. A motorcycle comprising:
- a sprocket cover for covering a lateral side of a drive sprocket for driving a chain adapted to transmit power to a rear wheel; and
- a clutch release cover for covering a lateral side of a clutch release lever linked with a cable connected to a clutch operational lever,
- wherein the sprocket cover and the clutch release cover are formed integrally with each other and
- wherein the clutch release cover is provided with a raised projection formed at a leading end with a curvedly depressed, concave portion which is engaged with a curvedly protruding portion of a crankcase, and the raised projection is formed to contact a lateral surface of the protruding portion.

13. The motorcycle according to claim 12, wherein the curvedly protruding portion of the crankcase is formed by outwardly projecting a clutch release lever installing portion installed with the clutch release lever, and the clutch release cover formed integrally with the sprocket cover is attached to and abutted against the curvedly protruding portion.

14. The motorcycle according to claim 12, wherein the sprocket cover is formed such that a sprocket cover main body portion and the clutch release cover portion are formed integrally with each other with an arcuate edge portion put therebetween.

15. The motorcycle according to claim 12, wherein the sprocket cover is provided at two positions along an arcuate edge portion with holes adapted to receive bolts.

16. The motorcycle according to claim 12, wherein the sprocket cover is provided with multiple opening portions between an arcuate edge portion and a linear edge portion and a central portion thereof.

* * * * *